UNITED STATES PATENT OFFICE.

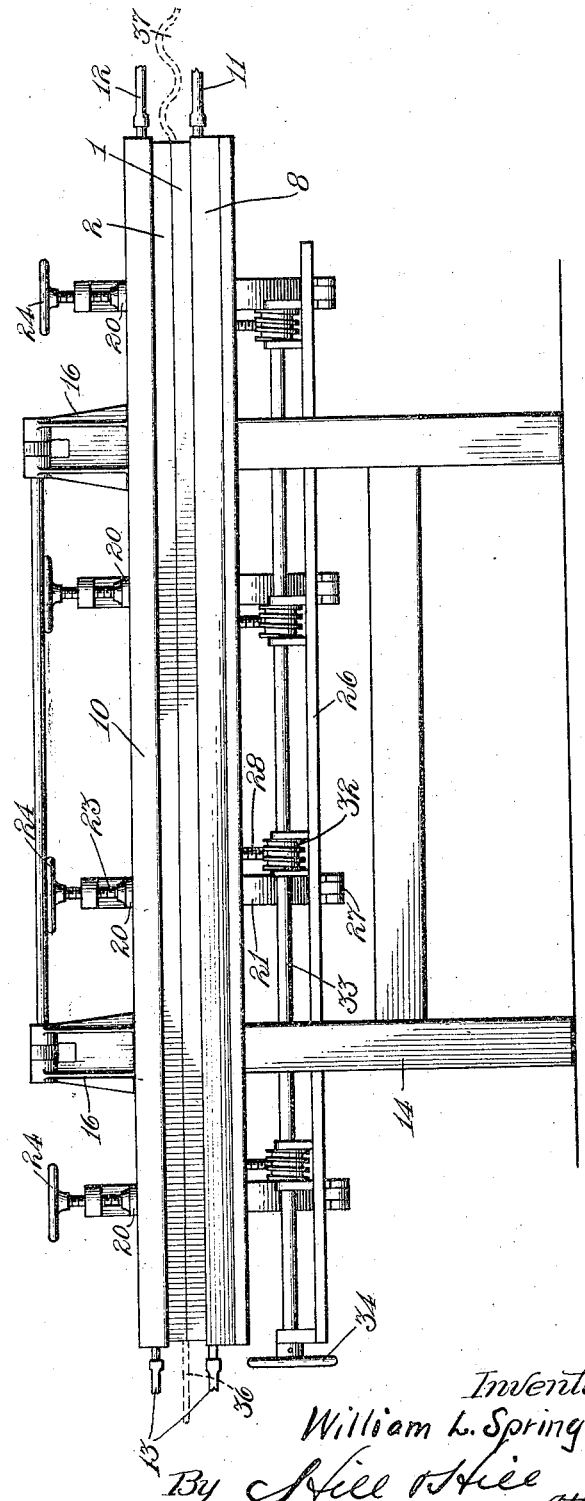

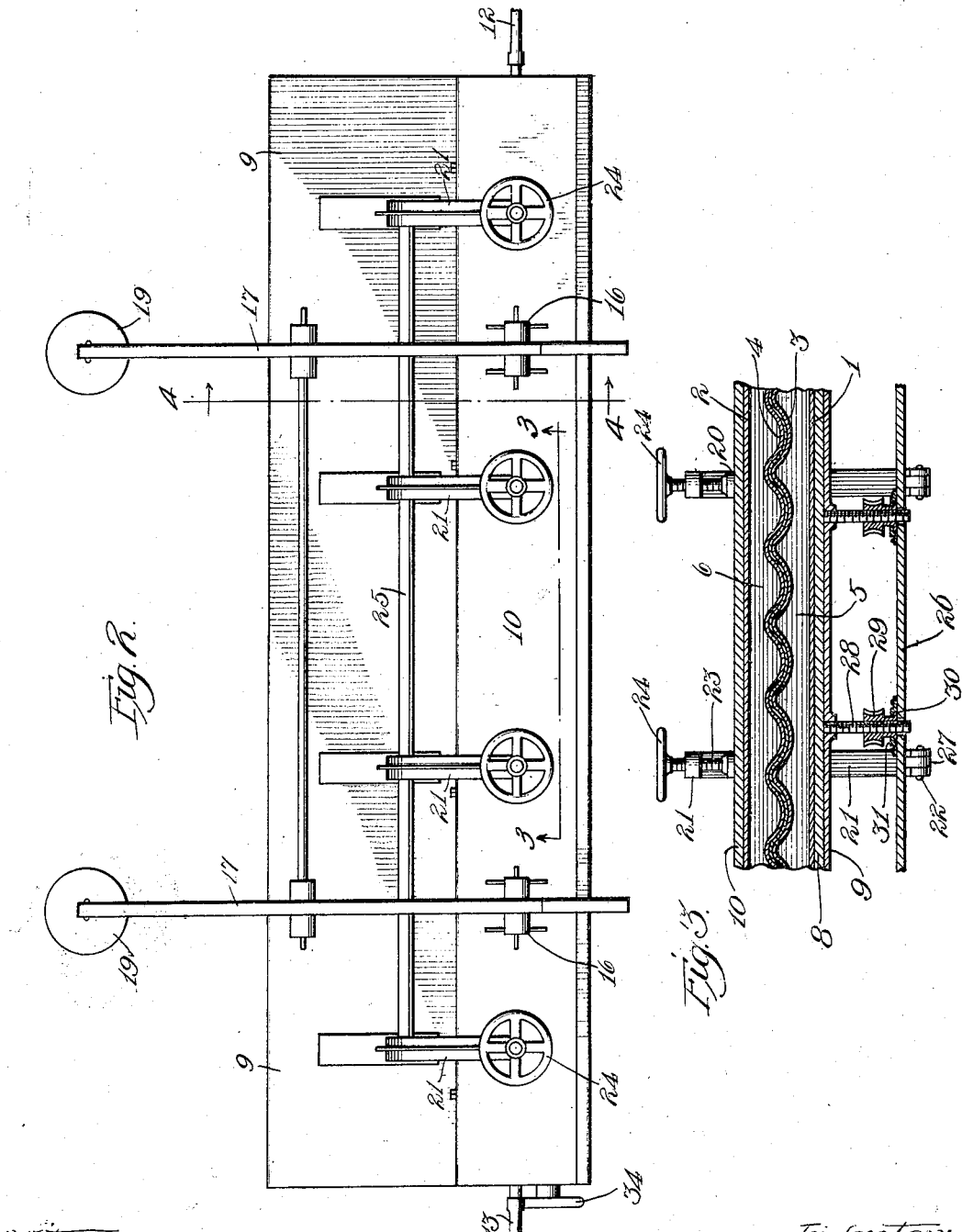

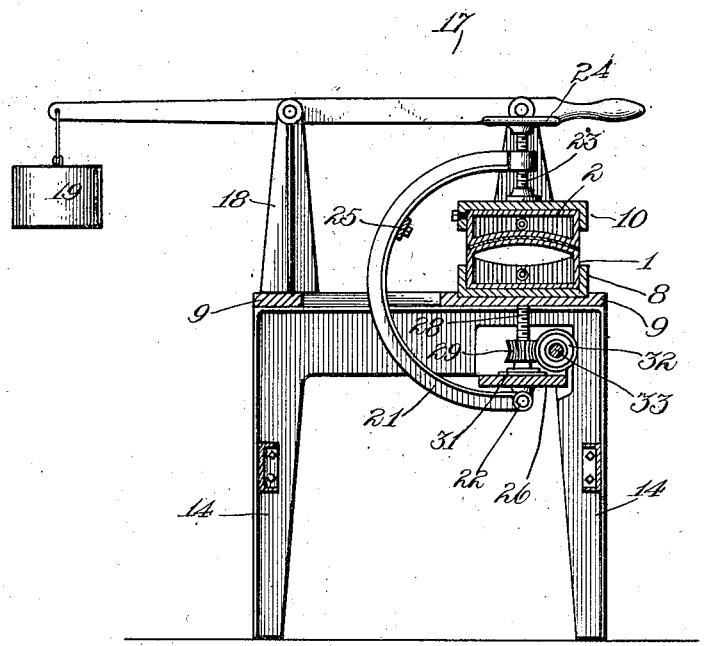
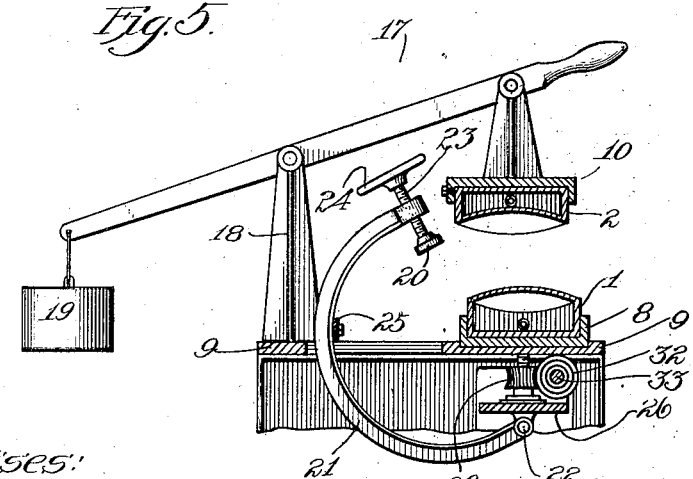

WILLIAM L. SPRINGER, OF PARK RIDGE, ILLINOIS.

MOLDING-MACHINE.

1,242,385.  Specification of Letters Patent.  Patented Oct. 9, 1917.

Application filed September 19, 1914. Serial No. 862,522.

*To all whom it may concern:*

Be it known that I, WILLIAM L. SPRINGER, a citizen of the United States, residing at Park Ridge, in the county of Cook and State of Illinois, have invented certain new and useful Improvements in Molding-Machines, of which the following is a description.

My invention belongs to that general class of devices known as molding machines, and relates particularly to a machine for the manufacture of rubber articles, especially rubber tire articles, such as pneumatic tires, outer casings, reliners, and the like. The invention has among its objects the production of a device of the kind described that is simple, convenient, durable, efficient, and satisfactory, which will operate with a minimum of time and labor, and consequently be economical in maintenance and operation. Other objects and advantages will be obvious to those skilled in the art in view of the disclosure hereinafter set forth.

To this end my invention consists in the novel construction, arrangement and combination of parts herein shown and described, and more particularly pointed out in the claims.

In the drawings, wherein like reference characters indicate like or corresponding parts, Figure 1 is a front elevation of the machine;

Fig. 2 is a top elevation of the same;

Fig. 3 is a sectional view taken substantially on line 3, 3 of Fig. 2;

Fig. 4 is a sectional view taken substantially on line 4, 4 of Fig. 2, and

Fig. 5 is a similar view of a portion of the machine, showing the mold sections separated.

Referring to the drawings, 1 and 2 represent the coöperating mold parts or sections, one being preferably stationary and the other movable, so that the parts may be separated and the article to be molded may be placed therein or removed after it has been molded. The mold members are provided with coöperating faces 3 and 4 the same being formed in the preferred form for interliners, as shown, in a series of parallel compound curves or undulations extending lengthwise and across or transversely the mold. It is obvious, however, that the molding surfaces will vary with the articles to be molded. Where tires, outer casings, or reliners, are molded, a mold similar to that shown is preferably employed, and in this case the material to be molded may be in the form of a long strip and fed through the mold, the same being molded in successive sections. The molded strip may be rolled as received from the machine, and cut into lengths or sold in long sections; or if not desired to mold long strips, the desired number of short pieces may be placed in the mold and the same formed. Regardless of the shape or form of the mold each part is preferably provided with a heating chamber therein, as shown mold part 1 has a heating chamber 5, and part 2 a heating chamber 6, suitable means being provided for conducting a heating medium thereto. Where live steam is employed as a heating medium, intake pipes 11 and 12 or 13 (see Fig. 1) or all of them, may be employed, the same being connected with a suitable source of supply.

The mold 1 is supported on a suitable frame or base comprising the top or bed plate 9, which is carried by suitable legs 14, or in an equivalent manner. The mold 1 may be secured to the top or bed plate 9 in any desired manner. As shown, it is arranged in a receiver 8, which maintains it in place, and also serves to retain the heat in the chamber, so that it will be radiated from the mold face. The mold section 1 is preferably made removable from its carrier 8, so that molds of different kinds and sizes may be mounted upon the machine and secured in place. The coöperating mold section 2 is preferably arranged in an adjustable or movable carrier 10, the same being secured thereto in any desired way. The same is, however, preferably made removable, so that it may be detached and another size or style fitted in place to correspond or mate with the lower mold part 1.

The upper mold is so supported that it may be raised from the lower mold so as to permit the insertion or removal of work with a minimum of labor and time, and also so that the work, when in long strips, may be fed through the machine in the easiest possible manner. As shown, I have provided the carrier 10 with brackets 16, which are pivotally secured to levers 17, carried by suitable brackets 18 on the machine. When the levers 17 are raised, the mold 2 is raised as desired. I preferably provide counterweights 19 on the extended ends of the levers or arms 17, so that a mold of considerable weight, may be easily and quickly raised without effort.

To clamp or lock the molds together and apply pressure thereto, I provide one or more clamping members 21, the number depending upon the size of the mold and work to be done, which are pivotally supported at 22 below the mold section 1, and provided with members 20 arranged to engage on the top of the carrier 10 to clamp the mold parts together. In the construction shown, I have a plurality of clamps 21, and means for tightening all of the clamps together, or controlling any one independently of the others, so as to vary the pressure. As shown, the contacting members 20 are arranged on threaded stems 23, or the like, having hand wheels 24, this construction permitting the adjustment of the members 20 relative the clamps 21. For simultaneous adjustment of all of the clamps, I secure the same to a bar or clamp carrying plate 26, which is preferably made adjustable relative the frame or top 9, which carries the lower mold. As shown, members 21 are each pivotally secured at 22 to brackets 27 on plates 26. Carried by the frame or top 9 are one or more studs, or the equivalent, which are threaded and arranged to be engaged by nuts 29. The nuts 29 are suitably secured to the plate 26 so as to support the same and prevent its dropping when the parts are in the position shown in Fig. 5. As illustrated in Fig. 3, the nuts 29 are each formed with teeth arranged to engage with a coöperating worm, as hereafter described, and flanged as at 30 for engagement with a coöperating part 31 secured to the plate 26.

Carried by plate 26 and extending along the machine below the top and preferably above the plate 26, is a shaft 33, carrying a worm 32 for each nut 29, the shaft being controlled by a hand wheel 34, or its equivalent for the purpose. All of the clamping members 21 are preferably secured together by a bar 25, or its equivalent.

Assuming that the parts are as shown in Fig. 1, with the mold in operation and a portion of the material in the mold, it may be assumed that 36 represents material to be fed into the machine, and 37 material that has been molded, it being understood, as previously set forth, that a single piece the length of the mold or less may be molded instead of a continuous piece. To open the mold the hand wheel 34 is turned in a direction to turn the nuts 29, so that the plate 26 is raised. This relieves the pressure on the top of the carrier 10, so that the clamping members 21 may be thrown back, as shown in Fig. 5. The handles 17 may then be raised, raising the mold 2, as shown in the same figure, so that the material may be moved, as for example, in the case of a strip moved toward the right in Fig. 1, until the molded part is substantially without the mold and a new section within. The upper mold 2 is then dropped into place, and the clamping members moved to the position shown in Fig. 4. The hand wheel 34 is then thrown, so as to rotate shaft 33 in a direction to move the nuts 29 away from the mold, thereby moving plate 26, simultaneously tightening all of the clamps on the upper mold. If it is desired to vary the pressure of any of the clamps, as for example to clamp one end tighter than the other, the same being varied gradually along the mold, the hand wheels 24 may be operated as desired, affording independent adjustment for each clamp. It will be particularly noted that the mold 2 is raised substantially vertically, so that no sliding transversely or longitudinally is required, and when it is brought back into place it drops into proper position to accurately coöperate with the mold part 1, and the mold being counterbalanced it may be raised with slight effort, even though of considerable weight and without danger of any injury to the operator, since he does not have to detach the mold itself to slide or raise it.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. In a device of the kind described and in combination, a mold comprising mating sections, each formed with a heating chamber therein and provided with means for conducting a heating medium thereto, and means for supporting and locking said mold sections together, comprising a fixed support for one mold section and a movable support for the other mold section, and adjustable means for locking said supports in operative position, comprising a plurality of clamping members disposed along the mold, means for simultaneously controlling the clamping members, and means for varying the pressure at any clamping member independently of the other clamping members.

2. In a device of the kind described and in combination, a suitable frame, a mold comprising two sections, one section supported by said frame, means mounted on said frame for carrying the other mold section, said means comprising a mold carrier, a pivoted supporting lever for said mold carrier, counterbalancing means for said mold carrier, and means for locking said mold sections in operative relation to each other, comprising clamping members adjustably secured to the under side of the frame top and extended to engage the top of the carrier of said mold sections for applying pressure to said carrying section at substantially the center thereof, and means for varying the adjustment of said clamping members.

3. In a device of the kind described and in combination, a suitable frame, a mold comprising two sections, one section supported by said frame, means mounted on said frame for carrying the other mold section, said means comprising a mold carrier, means for detachably securing the mold thereto, a pivoted supporting lever for said mold carrier, and means for locking said mold sections in operative relation to each other, a plurality of clamping members, an adjustable member arranged below the frame top, said clamping members pivotally secured thereto, means for supporting said adjustable member below the frame top, comprising a plurality of threaded studs secured to the frame, nuts arranged on said studs, means for operatively connecting said nuts with said member, and means for rotating said nuts in unison, comprising a rotatable shaft provided with worms thereon, said worm gears arranged to engage said nuts.

4. A mold for making rubber articles, comprising mold sections formed with coöperating surfaces, said sections each provided with a heating chamber therein, and with means for conducting a heating medium thereto, in combination with means for adjustably supporting the lower mold section, means for raising and lowering the upper section, and a series of clamps pivotally supported on the frame constructed to swing over the upper section when in place on the lower section and apply pressure to said section at a point well within its borders, and means carried by the clamps for holding the upper section in place thereon, substantially as described.

5. A device of the kind described, comprising mold sections formed with coöperating surfaces, each provided with a heating chamber therein, and means for conducting a heating medium thereto, in combination with means for supporting the lower section, a plurality of counterweighted levers adapted to lift the upper section, a plurality of clamps pivotally connected to the frame at their lower ends and adapted to swing over the lower section when it is in place, and screw-threaded clamping means carried by the upper end of the clamps and arranged to force the upper section firmly against the lower section, and additional threaded adjusting means for adjusting the lower ends of said clamps.

6. A device of the kind described, comprising a lower section and an upper section each provided with a heating chamber and means for conducting a heating medium thereto, a plurality of counterweighted levers adapted to support and operate the upper section, a plurality of clamping members pivotally supported at one end to the frame with the other end adapted to swing over the top of the upper section when in place, means carried by said clamping members to bring pressure upon the upper section when in place at a point near its center, and means for simultaneously operating the backward and forward movement of the clamps.

7. In a mold, the combination with a pair of mold sections formed with coöperating surfaces, a frame upon which one of said sections rests, means for movably supporting the other section, an adjustable operating member, supporting means for said member, a clamp carried by the operating member and adapted to engage one of said sections, and means for adjusting said operating member to apply pressure upon the mating section engaged by the clamp, said means including coöperating gears operatively associated with the adjusting means for said adjustable member.

8. In a mold, the combination with a pair of mold sections formed with coöperating surfaces, a frame upon which one of said sections rests, means for movably supporting the other section, an adjustable operating member carried by said frame, threaded adjusting devices for said member, a plurality of pivoted clamps attached to the operating member and adapted to engage one of said sections, and means for adjusting said operating member to clamp the sections, comprising coöperating driving devices carried by said threaded adjusting devices and the adjusting means.

9. In a mold, the combination with a pair of mold sections formed with coöperating surfaces, a frame upon which one of said sections rests, means for movably supporting the other section, an adjustable operating member carried by said frame, threaded adjusting devices for said member, a plurality of pivoted clamps attached to the operating member and adapted to engage one of said sections, and means for adjusting said operating member to clamp the sections, comprising coöperating driving devices carried by said threaded adjusting devices and the adjusting means, and independent adjustable members carried by the free ends of said clamps.

10. In a mold, the combination with a pair of mold sections, a frame upon which one of said sections rests, means for movably supporting the other section, an adjustable operating member, adjusting devices on said member, means attached to said operating member and adapted to engage the movable mold section, and means for adjusting said operating member to clamp the sections comprising coöperating gearing carried by the operating member and the adjusting means.

11. In a mold, the combination with a pair of mold sections, a frame for supporting one of said sections, means for movably supporting the other section, an adjustable operating member, adjusting devices for said member, clamps attached to the operating member and adapted to engage the movable mold section, and means for adjusting said operating member to clamp the sections including coöperating gears operatively associated with said adjusting devices and the adjusting means, substantially as described.

12. In a mold, the combination with a pair of mold sections, of means for supporting the same, means for forcing one of said sections into engagement with the other comprising an adjustable member, and an adjusting means having gear connections with said adjustable member at spaced points.

13. In a mold, the combination with a pair of mold sections, of means for supporting the same, means for forcing one of said sections into engagement with the other comprising an adjustable member, and an adjusting means for operating said member including a plurality of driving gears associated therewith and engaging parts arranged in spaced relation on said adjustable member, substantially as described.

In testimony whereof, I have hereunto signed my name in the presence of two subscribing witnesses.

WILLIAM L. SPRINGER.

Witnesses:
 ROY W. HILL,
 CHARLES I. COBB.

Copies of this patent may be obtained for five cents each, by addressing the "Commissioner of Patents, Washington, D. C."